Feb. 2, 1926.  
R. O. HENDRICKSON  
TRACTOR  
Filed July 25, 1925
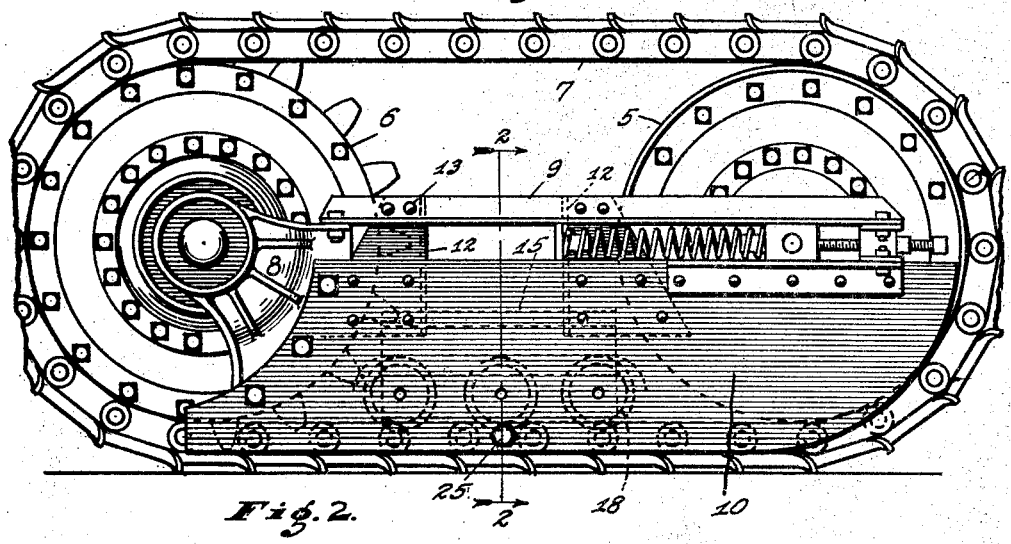
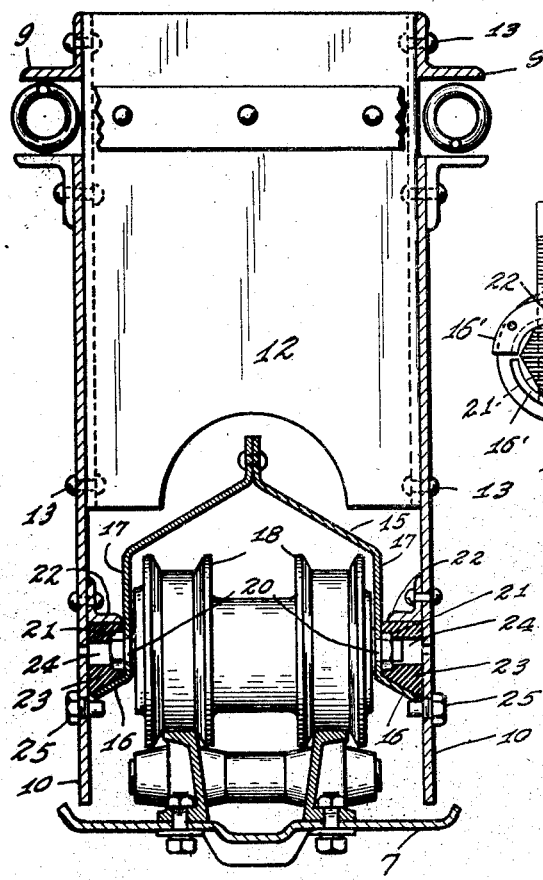
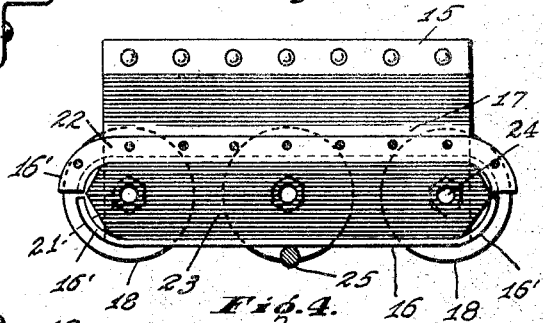
INVENTOR.
ROBERT O. HENDRICKSON,
BY James A. Walsh,
ATTORNEY.

Patented Feb. 2, 1926.

1,571,628

UNITED STATES PATENT OFFICE.

ROBERT O. HENDRICKSON, OF RACINE, WISCONSIN, ASSIGNOR TO BELLE CITY MANUFACTURING COMPANY, OF RACINE, WISCONSIN, A CORPORATION.

TRACTOR.

Application filed July 25, 1925. Serial No. 46,054.

*To all whom it may concern:*

Be it known that I, ROBERT O. HENDRICKSON, a citizen of the United States, residing at Racine, in the county of Racine and State of Wisconsin, have invented certain new and useful Improvements in Tractors, of which the following is a specification.

In crawlers of the tractor type embodying steering and driving wheels and an endless track, it is of importance to employ a series of rollers for engaging and stabilizing the moving track and at the same time guide the track in its travel along roads or in field conditions, and my present invention relates particularly to this feature. While my improvement is shown in connection with a crawler attachment for a tractor, it will be apparent that it is applicable to tractors generally employing endless tracks in connection with driving and steering wheels, as will more fully appear.

In the accompanying drawing, forming part hereof, Figure 1 is a side elevation of a crawler attachment for tractors embodying my improvements; Fig. 2 a detail section on an enlarged scale taken on the dotted line 2—2 in Fig. 1; Fig. 3 is a side elevation of the demountable roller unit which I employ, the same being shown as removed from the tractor body, and Fig. 4 is a fragmentary detail.

In said drawing the portions marked 5 and 6 indicate the steering and driving wheels, respectively, and 7 an endless track connecting said wheels. The frame structure comprises the members 8 and 9 to which the sideboards or guards 10 are secured, one at each side of the wheels, the guards being suitably braced by transverse plates 12 connected thereto by bolts or rivets 13. As said elements and details of construction associated therewith form no part of my present invention they will only be referred to incidentally herein in describing my present improvements.

The demountable track guide comprises a frame, as 15, terminating in or provided with flanges or retainers 16 at each side, the side walls 17 of said frame serving to support the axles of a series of rollers 18, said rollers being preferably of grooved or flanged formation and arranged in pairs, as indicated in Fig. 2. The axles 20 of these rollers project through the side walls 17 of the frame and are held in position at each side by nuts 21 or otherwise, as desired. In each side of guards 10 is a keeper preferably comprising an inwardly projecting ledge or plate 22, between which and the frame flange 16, both being curved toward each other at their ends, as at 16′, I install resilient material, 23, having recesses for the ends of axles, 20 or openings 24 may be provided for the reception of the axles, which openings may also serve for the introduction of lubricants. In order to securely retain the resilient material I curve the ends of ledge 22 and flange 16 toward each other, as before stated, the formation being indicated at 16′ in Figs. 3 and 4, thus preventing end play of the material and assuring its stable maintenance. It will thus be seen that frame 15 and the rollers 18 are assembled as a unit, and can be removed and replaced at will within the guards 10, which is readily accomplished. By removing track 7 and raising one end of the crawler attachment and then withdrawing the bolts 25, or other device, the unitary structure may be readily inserted and mounted in the resilient bearings 23 in the position indicated in Fig. 2. When in proper position the removable bolts 25 are inserted through guards 10 to extend beneath flanges 16, which is sufficient to sustain the unitary track guide, and when it is desired to remove said guide the bolts 25 are withdrawn and the unit readily taken from its bearings between the guards 10.

In the manner described I provide a demountable roller assembly which may be readily installed and removed from the tractor, and considering its ability to sustain the tractor, is of a comparatively simple character, the frame 15 being riveted at its upper side and the assemblage of the rolls so related thereto that repairing and renewal of its parts can be accomplished without difficulty. The resilient bearings between the ledges 22 and flanges 16 are adapted to absorb road shocks and thus protect the entire tractor against the same, and the advantage of such resilient mounting over coiled spring mounting is that it is retained in position and obviates the requirement of guides and fastening devices subject to disarrangement and breakage, and there being no metallic contact between the roller assembly and the tractor frame there will be no appreciable wear of the parts thereof. The inclined formation of frame 15 deflects débris falling from the upper side of the track and prevents it from falling upon and clogging the rolls 18.

I claim as my invention:

1. In a tractor, a demountable unitary track guide comprising a frame embodying flanges at its sides, rollers mounted in said frame, retaining means in said tractor above said flanges, yielding means mounted between said flanges and retaining means in which said rollers are mounted, and removable means for permitting the insertion and withdrawal of said track guide.

2. In a tractor, a demountable unitary track-guide, comprising a frame having an inclined deflector at its top, side walls extending therefrom, rollers mounted in said frame, retainers extending from said side walls, keepers in said tractor, yielding means mounted between said retainers and keepers in which said rollers are mounted, and removable means for permitting the insertion and withdrawal of said track-guide.

In testimony whereof I affix my signature

ROBERT O. HENDRICKSON.